US005633501A

United States Patent [19]

Amleshi et al.

[11] Patent Number: 5,633,501

[45] Date of Patent: May 27, 1997

[54] COMBINATION PHOTOELECTRIC AND IONIZATION SMOKE DETECTOR

[75] Inventors: Peerouz Amleshi, Chicago; Derrick J. Hesser, Hoffman Estates, both of Ill.

[73] Assignee: Pittway Corporation, Chicago, Ill.

[21] Appl. No.: 475,066

[22] Filed: Jun. 7, 1995

[51] Int. Cl.[6] .......... G01T 1/185; G01N 21/27

[52] U.S. Cl. .......... 250/381; 250/382; 250/384; 250/385.1; 250/554; 356/338; 356/339; 340/628; 340/629; 340/630; 340/577; 340/579; 431/79

[58] Field of Search .......... 250/381, 382, 250/384, 385.1, 554; 356/338, 339; 340/628, 629, 630, 577, 579; 431/79

[56] References Cited

U.S. PATENT DOCUMENTS

| | | | |
|---|---|---|---|
| 3,514,602 | 5/1970 | Rhodes | 250/385.1 |
| 3,609,435 | 9/1971 | Taylor | 250/385.1 |
| 4,225,860 | 9/1980 | Conforti | 340/630 |
| 4,456,907 | 6/1984 | Johnson | 250/385.1 |
| 4,469,953 | 9/1984 | Fujisawa et al. | 250/574 |
| 4,622,432 | 11/1986 | Yamazaki | 136/246 |
| 4,631,412 | 12/1986 | Turlej | 250/385.1 |
| 4,761,557 | 8/1988 | Sasaki et al. | 250/385.1 |
| 4,786,811 | 11/1988 | Sasaki | 250/385.1 |
| 5,160,916 | 11/1992 | Ishi et al. | 250/385.1 |
| 5,351,034 | 9/1994 | Berger et al. | 340/577 |
| 5,399,864 | 3/1995 | Igarashi et al. | 250/385.1 |
| 5,485,144 | 1/1996 | Amleshi et al. | 250/381 |

FOREIGN PATENT DOCUMENTS

| | | |
|---|---|---|
| 0475884 | 9/1991 | European Pat. Off. . |
| 2734347 | 2/1979 | Germany . |
| 4324439 | 1/1995 | Germany . |
| 4411090 | 7/1995 | Germany . |

*Primary Examiner*—Michael J. Tokar
*Assistant Examiner*—Virgil O. Tyler
*Attorney, Agent, or Firm*—Dressler, Goldsmith, Milnamow & Katz, Ltd.

[57] ABSTRACT

An ionization chamber for use in a smoke detector includes first and second outer electrodes and a non-reflective center electrode. The non-reflective center electrode can be formed as a metal electrode having a non-reflective coating or as a non-reflective, conductive plastic elements. The ionization chamber can be incorporated into combination smoke detector which includes a photoelectric sensor. A non-reflective center electrode, associated with the ion-type sensor is symmetrically located in the detector and displaced from the photoelectric sensor.

21 Claims, 2 Drawing Sheets

COMBINATION PHOTOELECTRIC AND IONIZATION SMOKE DETECTOR

FIELD OF THE INVENTION

The invention pertains to multiple sensor smoke detectors. More particularly, the invention pertains to ionization-type smoke detectors wherein a center electrode of the detector is formed with a nonreflective surface.

BACKGROUND OF THE INVENTION

Both ionization-type and photoelectric-type smoke detectors are known and have proved to be useful in providing warnings of the existence of fire. It is well known that the two types of detectors are sensitive to different types of smoke.

Ionization-type detectors respond rapidly to flaming fires. Photoelectric-type detectors respond rapidly to smoldering fires.

There has been a continuing interest in combining such sensors into a single housing so as to obtain the advantages of both types of detectors in a single unit. In this regard, it is desirable to be able to provide the smallest possible internal volume in the photoelectric-type detector so as to minimize the overall size of the detector.

It is also known to be desirable to minimize reflections within the internal volume of photoelectric-type detectors so as to minimize background noise. Thus, there continues to be a need for combination ionization-type and photoelectric-type smoke detectors which can be manufactured with minimal volumes. Further, it would be desirable to create a structure for a combination detector wherein reflections within the volume of the housing which includes the two types of detectors are minimized.

SUMMARY OF THE INVENTION

An ionization-type smoke detector is provided. The detector includes first and second spaced electrodes. A third electrode is disposed between the first and second electrodes. The third electrode has a nonreflective surface.

In one aspect of the invention, at least the first electrode could be formed of a conductive, nonreflective plastic. In yet another aspect of the invention, the third electrode could be formed with either a nonreflective coating or a nonreflective metal layer.

In yet another aspect of the invention, a multiple sensor smoke detector can be provided. The detector incorporates a housing which defines an internal volume. The housing also includes a plurality of apertures for ingress and egress of smoke.

First and second, different, smoke sensors are provided within the housing. The two different sensors occupy the internal volume of the housing.

One of the sensors could be an ionization-type smoke sensor. This sensor includes first and second spaced electrodes with a third electrode disposed therebetween. At least the third electrode is nonreflective. In yet another aspect of the invention, the housing can be formed of a conductive plastic and also function as one of the other electrodes for the ionization-type sensor.

The second sensor could be a photoelectric-type sensor. A source of radiant energy can be carried by the housing so as to emit radiant energy into the internal volume. A sensor of radiant energy, such as a photodiode or a phototransistor could be located within the internal volume so as to collect scattered light.

In response to the presence of smoke and particulate matter in the internal volume, a portion of the radiant energy will be scattered and can be collected at the photosensor.

The presence of a nonreflective third electrode associated with the ionization-type sensor minimizes reflections therefrom which could contribute to noise at the photosensor.

These and other aspects and attributes of the present invention will be discussed with reference to the following drawings and accompanying specification.

DETAILED DESCRIPTION OF THE PREFERRED EMBODIMENTS

Figure 1:
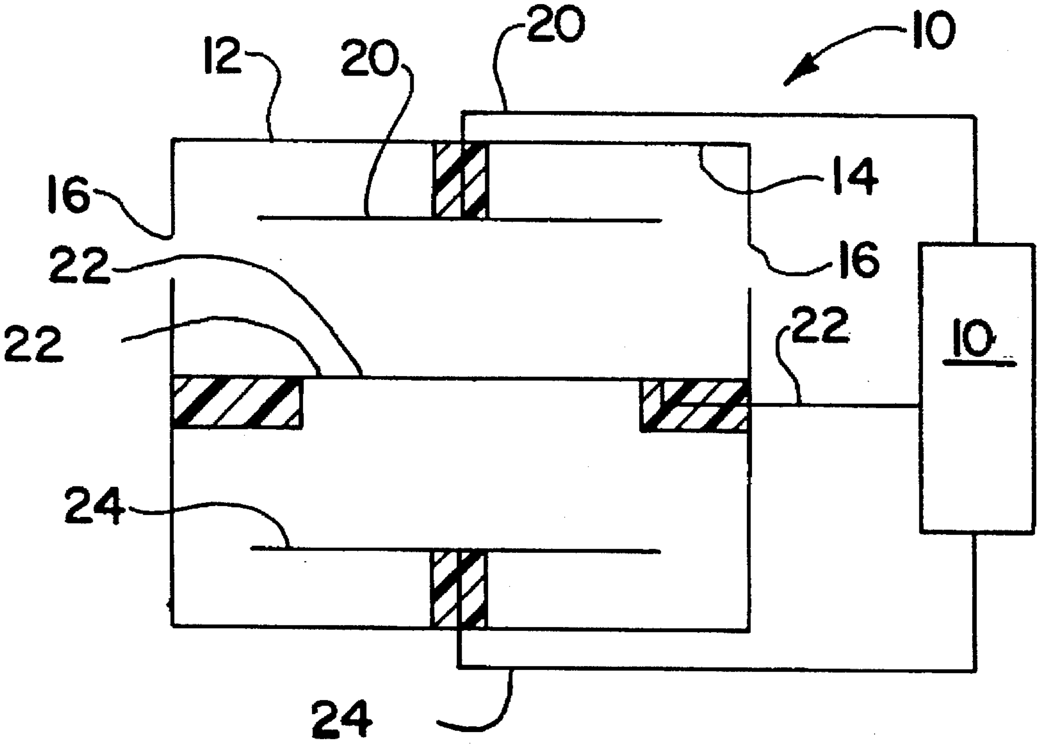
FIG. 1 is a side sectional schematic view of an ionization-type detector in accordance with the present invention.

While this invention is capable of embodying many different forms, there are shown in the drawing, and will be described herein in detail, specific embodiments thereof with the understanding that the present disclosure is to be considered as an exemplification of the principles of the invention and is not intended to limit the invention to the specific embodiments illustrated.

FIG. 1 illustrates a side sectional, schematic view of an ionization-type smoke sensor 10 in accordance with the present invention. The sensor 10 includes a housing 12 which defines an interior volume or region 14. Apertures 16 are provided to permit the entry and exit of smoke in the ambient atmosphere.

The ionization-type sensor 10 includes three electrodes 20, 22 and 24. Each of the electrodes 20–24 is illustrated and supported, as would be understood by one of skill in the art, in and by the housing 12. The exact details of the ionization-type sensor 10 may vary and are not a limitation of the present invention. Each of the electrodes 20–24 is coupled via a corresponding conductor **20*a*–24*a* to circuitry 10*a* of a conventional type for energizing the detector 10 and for sensing variations in output voltage of the center electrode 22**.

The center electrode 22, in accordance with the present invention, is formed with at least a nonreflective upper surface **22*b*. The nonreflective surface 22*b* can be achieved by a variety of techniques without departing from the spirit and scope of the present invention. For example, a nonreflective coating can be deposited on the surface 22*b*. Alternately, a nonreflective metal layer can be deposited onto the surface 22*b***.

Figure 2:
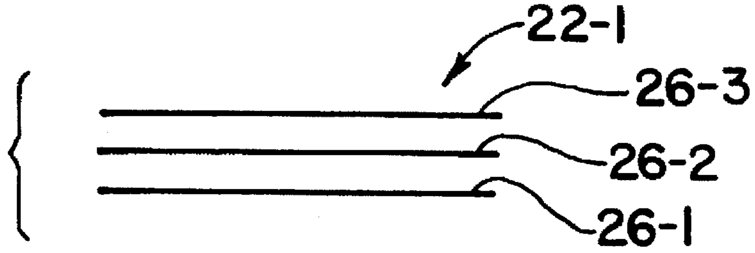
FIG. 2 is an expanded side view of a center electrode of the detector of FIG. 1 illustrating various elements thereof.

FIG. 2 illustrates in more detail a composite, multi-element center electrode structure 22-1 usable with the detector 10. The center electrode 22-1 is formed with a first layer or substrate 26-1 which could be stainless steel. A second layer 26-2 of nickel can be plated onto the stainless steel substrate 26-1. Finally, a top layer 26-3 of black, nonreflective, chrome can be plated onto the layer of nickel 26-2.

The electrode structure 22-1 having a black, nonreflective, upper surface 22-b formed of the layer 26-3 minimizes reflections therefrom. It will be understood that preferably, the nonreflective surface 22-b will be nonreflective over a variety of wavelengths including infrared.

An ionization-type sensor, such as a the sensor 10, can be used in a combination smoke detector. In such an arrangement, the volume associated with the ionization-type sensor can overlap in part the volume associated with the photoelectric sensor.

Allowing the two volumes to overlap will produce a more compact unit. As a result of the nonreflective center electrode 22, described previously, the fact that the two types of sensors share a common volume will not significantly increase the noise level of the photoelectric-type sensor notwithstanding the close proximity of the elements of the ionization-type sensor.

Figure 3:
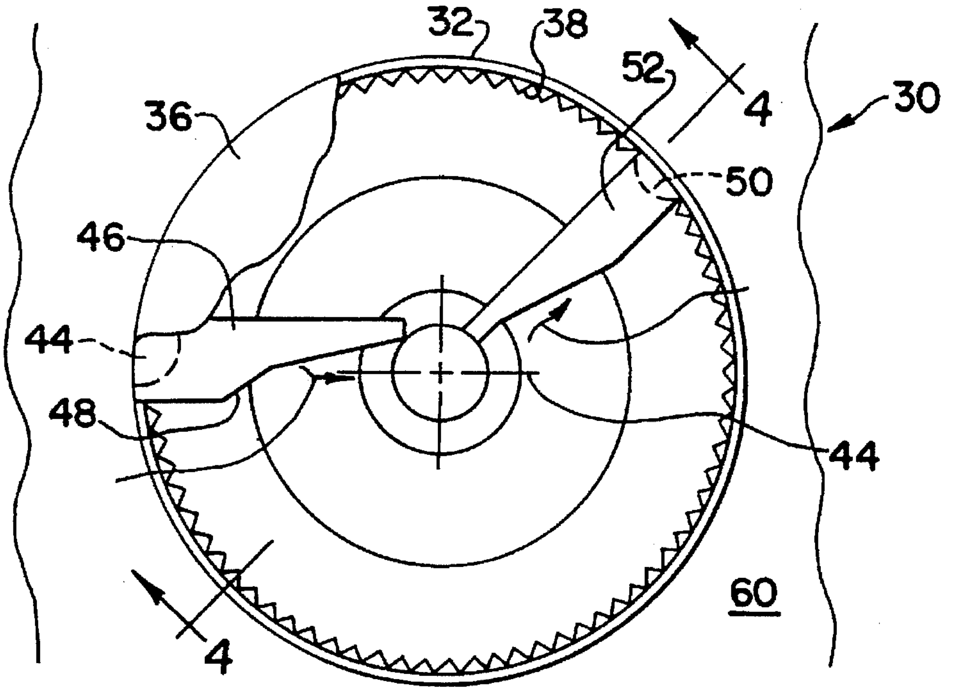
FIG. 3 is a top plan view, with the cover partially broken away of a multiple sensor smoke detector, in accordance with the present invention.
Figure 4:
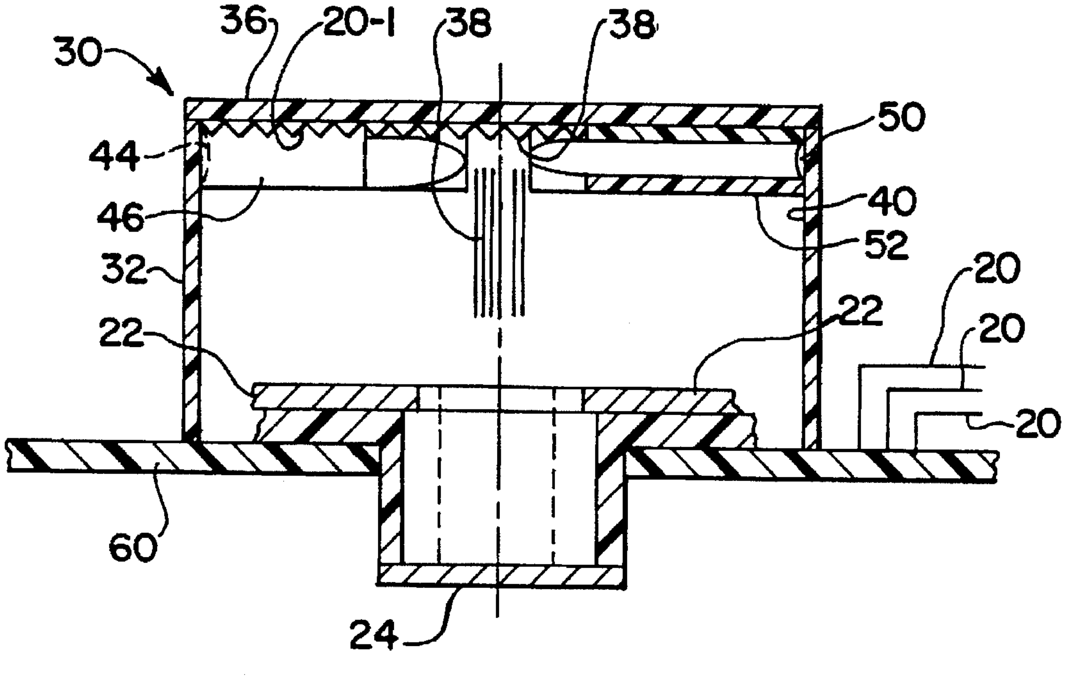
FIG. 4 is a sectional view taken along plane 4—4 of FIG. 3.

FIG. 3 illustrates a top view of the detector 30, partly broken away, for illustration. The detector 30 includes a housing 32 with apertures, not illustrated, to permit ingress and egress of ambient smoke. A plurality of sawtooth-type projections 38 is formed along an interior peripheral surface of the housing 32 for purposes of minimizing reflections within a bounded internal volume or region 40 defined by the housing 32.

The detector 30 includes both an ionization-type sensor as well as a photoelectric-type sensor. The photoelectric-type sensor includes a source of radiant energy 44, such as a light emitting diode, laser diode or the like, which is carried at least in part by the housing 32. The source 44 projects radiant energy R, which could be in the infrared wavelength, into the volume 40. The source 44 is located within a hollow shield 46 with a tapered surface 48 for purposes of emitting radiant energy R primarily along a radial direction 44*a*.

The radiant energy R will be scattered, in a known fashion, by smoke particles which have entered the region 40 from the exterior ambient atmosphere. A portion of the scattered radiant energy, R', will fall upon a sensor, such as the sensor 50 which could be a photodiode or a phototransistor. Output from the sensor 50 is a signal indicative of the level of smoke particulate matter in the chamber 40.

As is well known with respect to photoelectric-type sensors, it is desirable to maximize the signal-to-noise ratio by minimizing reflections in the internal scattering volume, such as the volume 40. This is achieved in part by the grooved surfaces 38 as well as a shield 52, having a similar shape to the shield 46 which optically isolates the sensor 50 from the source 44 and only permits scattered radiant energy R' to fall upon the sensor 50.

Sharing the scattering volume 40 is a ionization-type sensor which incorporates first, second and third electrodes. In accordance with the present invention, a first, or outer electrode 20-1 can be formed as part of the housing 32, provided, that the housing 32 is in turn manufactured of conducting, nonreflective plastic. Alternately, the outer electrode 20-1 could be formed as a metal disk carried by the cover 36. It will be understood that the exact structure of the outer electrode 20-1 is not a limitation of the present invention.

Spaced from the outer electrode 20-1, but in the scattering volume 40 is the second or middle electrode 22. The electrode 22 could be formed with a nonreflective coating 22*b* as discussed previously. Alternately, the electrode 22 could be formed as a multi-layer element 22-1, FIG. 2 as discussed previously. Displaced from the second or middle electrode 22 is the third or inner electrode 24.

The detector 30 is carried on a nonconductive epoxy-type printed circuit board 60. The conductors 20*a*–20*c* can be brought to a convenient portion of the PC board 60 using standard deposition techniques.

The combination detector 30 with the nonreflective center electrode 22 can be manufactured with a relatively small scattering volume 40 in view of the fact that the upper surface 22*b* of the middle electrode 22 is nonreflective and absorbs that portion of the emitted radiant energy R which is incident thereon. Reflected radiant energy incident thereon will also be absorbed.

It will also be understood that the center electrode 22, along with the inner electrode 24 could, if desired, be formed of a conductive, nonreflective plastic.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. An ionization-type smoke detector comprising an ionization chamber with:

first and second spaced electrodes; and a third electrode, disposed between said first and second electrodes wherein said third electrode is formed of a conductive material and has a non-reflective surface.

2. A detector as in claim 1 wherein said third electrode carries a non-reflective coating.

3. A detector as in claim 1 wherein said third electrode includes a non-reflective metal layer.

4. A detector as in claim 1 wherein at least said third electrode is formed of a non-reflective, conductive plastic.

5. A detector as in claim 1 wherein said third electrode is formed with a plurality of metallic layers with one of said layers providing a substrate and another, displaced therefrom, providing said non-reflective surface.

6. A multiple sensor detector comprising:

a housing which defines an internal region;

an ionization-type smoke sensor carried within said housing wherein said sensor includes spaced first and second electrodes with a third, conductive, electrode, disposed therebetween wherein at least said third electrode is non-reflective; and another sensor carried within said housing.

7. A detector as in claim 6 wherein said sensors share said internal region and said electrodes and said housing are symmetrically located relative to a common center line.

8. A detector as in claim 6 wherein said another sensor includes a photoelectric smoke sensor.

9. A detector as in claim 8 wherein a portion of said housing forms said first electrode.

10. A detector as in claim 6 wherein said another sensor includes a source of radiant energy, wherein said source injects radiant energy into a portion of said region and wherein said non-reflective third electrode absorbs any of said radiant energy which is incident thereon.

11. A detector as in claim 10 wherein said third electrode is formed with a non-reflective metal surface.

12. A detector as in claim 10 wherein said another sensor includes an electronic sensor of scattered radiant energy, wherein said electronic sensor is carried by said housing, within said region, and oriented to receive a portion of any of said radiant energy scattered by particulate matter in said region.

13. A detector as in claim 11 wherein said non-reflective metal surface includes a plated layer.

14. A detector as in claim 6 wherein said third electrode carries an infra-red absorbent coating.

15. A combination photoelectric and ionization smoke detector comprising:

a housing which defines an internal volume;

a photoelectric-type smoke sensor carried by said housing, at least in part, within said volume;

an ion-type smoke sensor carried by said housing, at least in part, within said volume, and wherein said ion-type sensor includes a non-reflective, conductive, electrode which extends, at least in part, into said volume and is, in part, spaced from said housing.

16. A detector as in claim 15 wherein said ion-type sensor includes first and second spaced electrodes with said non-reflective electrode spaced therebetween.

17. A detector as in claim 15 wherein said housing is formed, at least in part, of a conductive plastic, wherein a portion of said conductive plastic forms a second electrode for said ion-type detector and wherein said electrodes are spaced from one another.

18. A detector as in claim 1 wherein said third electrode is formed of a conducting plastic.

19. A detector as in claim 15 wherein said non-reflective electrode is formed of a black conducting plastic.

20. A detector as in claim 16 wherein a portion of said housing is conductive and forms said first electrode and wherein said photoelectric type smoke sensor includes a light source and a photo detector wherein said source and said detector are positioned adjacent to said first electrode and wherein said electrodes are symmetric about a common center line.

21. A combined photoelectric and ionization smoke detector comprising:

a housing which defines an internal volume;

a photo-electric-type smoke detector carried in said housing wherein said detector includes a source of radiant energy and a spaced apart sensor; and an ionization-type smoke detector carried in said housing wherein said ionization-type smoke detector includes first, second and third spaced apart electrodes with said second electrode between said first and third electrodes, and wherein at least said first and said second electrodes are substantially non-reflective with said source and said sensor are located in a region in said housing between said first and second electrodes.

* * * * *